(12) United States Patent
Inoue et al.

(10) Patent No.: US 11,953,315 B2
(45) Date of Patent: Apr. 9, 2024

(54) VEHICLE WHEEL ASSEMBLY POSITION MEASUREMENT METHOD AND APPARATUS THEREOF

(71) Applicant: MAZDA MOTOR CORPORATION, Hiroshima (JP)

(72) Inventors: Taiga Inoue, Hiroshima (JP); Akira Fukunaga, Hiroshima (JP); Yoko Doi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 263 days.

(21) Appl. No.: 17/761,699

(22) PCT Filed: Sep. 3, 2020

(86) PCT No.: PCT/JP2020/033458
§ 371 (c)(1),
(2) Date: Mar. 18, 2022

(87) PCT Pub. No.: WO2021/065326
PCT Pub. Date: Apr. 8, 2021

(65) Prior Publication Data
US 2022/0341730 A1   Oct. 27, 2022

(30) Foreign Application Priority Data
Sep. 30, 2019   (JP) .................................. 2019-178997

(51) Int. Cl.
*G01B 11/26*   (2006.01)
*G01B 11/02*   (2006.01)
(Continued)

(52) U.S. Cl.
CPC ............ *G01B 11/26* (2013.01); *G01B 11/026* (2013.01); *G01B 11/0608* (2013.01);
(Continued)

(58) Field of Classification Search
CPC .... G01M 17/013; G01M 17/02; G01M 17/04; G01M 17/06; G01B 5/0025;
(Continued)

(56) References Cited

U.S. PATENT DOCUMENTS

| | | | | |
|---|---|---|---|---|
| 5,600,435 A | * | 2/1997 | Bartko ............... | G01B 11/2755 348/E7.086 |
| 5,978,077 A | * | 11/1999 | Koerner ............. | G01B 11/2755 348/136 |

(Continued)

FOREIGN PATENT DOCUMENTS

| | | | |
|---|---|---|---|
| CN | 101178305 A * | 5/2008 | ........... G01B 11/275 |
| EP | 0757229 A2 * | 8/1996 | |

(Continued)

OTHER PUBLICATIONS

International Search Report issued in PCT/JP2020/033458; dated Nov. 24, 2020.

*Primary Examiner* — Gordon J Stock, Jr.
(74) *Attorney, Agent, or Firm* — Studebaker & Brackett PC

(57) ABSTRACT

A vehicle wheel assembly position measurement apparatus measures, at each of at least three measurement positions in a circumferential direction, a distance in a vehicle width direction between each of plural measurement points located on a specified line that crosses a lateral surface of a tire section from an inner circumferential end to an outer circumferential end and a respective one of distance measuring instruments, calculates an approximate curve indicating a relationship between a position in an extending direction of the specified line and the distance of each of the measurement points at the respective measurement position, calculates a rotation center position of a wheel assembly from a specific position of the approximate curve at the measurement position, and calculates a height position of the wheel (Continued)

assembly relative to a vehicle body from the rotation center position and a height position of a specified portion of the vehicle body.

16 Claims, 6 Drawing Sheets

(51) Int. Cl.
*G01B 11/06* (2006.01)
*G01B 11/14* (2006.01)
*G01B 11/245* (2006.01)
*G01B 11/275* (2006.01)

(52) U.S. Cl.
CPC ............ *G01B 11/14* (2013.01); *G01B 11/245* (2013.01); *G01B 11/2755* (2013.01); *G01B 2210/146* (2013.01); *G01B 2210/286* (2013.01)

(58) Field of Classification Search
CPC ... G01B 11/026; G01B 11/0608; G01B 11/14; G01B 11/16; G01B 11/24; G01B 11/245; G01B 11/25; G01B 11/2518; G01B 11/26; G01B 11/27; G01B 11/272; G01B 11/275; G01B 11/2755; G01B 11/30; G01B 11/303; G01B 11/306; G01B 11/22; G01B 2210/10; G01B 2210/14; G01B 2210/143; G01B 2210/146; G01B 2210/22; G01B 2210/28; G01B 2210/283; G01B 2210/286
See application file for complete search history.

(56) References Cited

U.S. PATENT DOCUMENTS

| | | | | |
|---|---|---|---|---|
| 6,400,451 | B1 * | 6/2002 | Fukuda | G01B 11/2755 356/139.09 |
| 6,473,978 | B1 * | 11/2002 | Maas | G01B 5/255 33/203.13 |
| 6,657,711 | B1 * | 12/2003 | Kitagawa | G01B 11/2755 356/139.09 |
| 7,230,694 | B2 * | 6/2007 | Forster | G01B 11/2755 356/139.03 |
| 7,454,841 | B2 * | 11/2008 | Burns, Jr. | G01B 11/2513 356/139.09 |
| 8,363,979 | B2 * | 1/2013 | Abraham | G01B 11/2755 382/296 |
| 8,400,624 | B2 * | 3/2013 | De Sloovere | G06T 7/521 356/139.09 |
| 8,548,769 | B2 * | 10/2013 | Kanazawa | G01M 17/06 701/65 |
| 8,836,764 | B2 * | 9/2014 | Gruetzmann | G01B 11/275 348/46 |
| 9,188,439 | B2 * | 11/2015 | Seifert | G01C 11/025 |
| 10,475,201 | B1 * | 11/2019 | Hall | G01B 11/105 |
| 10,848,316 | B1 * | 11/2020 | Stieff | G01S 17/87 |

FOREIGN PATENT DOCUMENTS

| | | | |
|---|---|---|---|
| JP | H03-237307 | A | 10/1991 |
| JP | H06-331505 | A | 12/1994 |
| JP | H10176911 | A * | 12/1996 |
| JP | H10293017 | A * | 4/1997 |
| WO | WO-2018054888 | A1 * | 3/2018 |

* cited by examiner

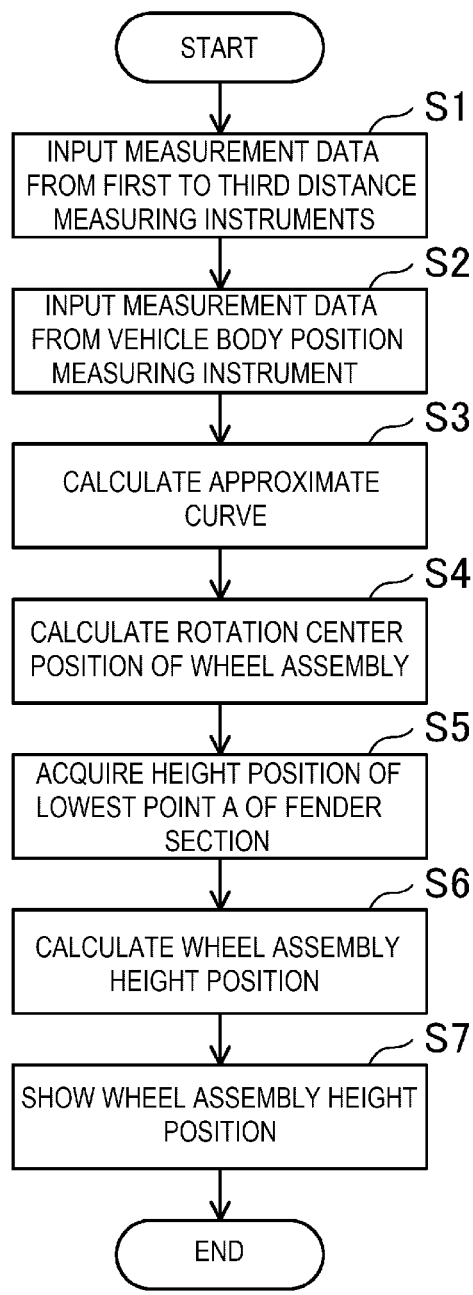

VEHICLE WHEEL ASSEMBLY POSITION MEASUREMENT METHOD AND APPARATUS THEREOF

TECHNICAL FIELD

The present disclosure belongs to a technical field that relates to a vehicle wheel assembly position measurement method and a vehicle wheel assembly position measurement apparatus for measuring a height position of a wheel assembly relative to a vehicle body.

BACKGROUND

Conventionally, in order to improve vehicle steering stability, wheel alignment of a vehicle is evaluated, and, on the basis of the evaluation result, a damper characteristic and a bush characteristic are adjusted.

For example, a measurement apparatus is disclosed in JP-A-6-331505. A load cell is arranged to each member that supports respective wheel assembly of the vehicle from an outer side in a vehicle width direction. Then, the measurement apparatus uses each of the load cells to measure a load, which is generated when the wheel assembly attempts to move outward in the vehicle width direction while the wheel assembly rotates, so as to evaluate a degree of one-sided drift of the vehicle.

A wheel alignment measurement apparatus for an automobile is disclosed in JP-A-3-237307. Three laser displacement sensors for measuring a motion trajectory of an axle in a three-dimensional space are provided to a wheel-side sensor unit that is attached to the wheel side, and three reflectors corresponding to the three laser displacement sensors are provided to a platform-side sensor unit that is attached to a platform side. Then, the wheel alignment measurement apparatus of an automobile measures the motion trajectory of the axle in the three-dimensional space while adjusting and measuring distances between the laser displacement sensors and the reflectors.

SUMMARY

To obtain the favorable steering stability during travel of the vehicle, it is preferred not to only consider the wheel alignment in a vehicle stationary state as in JP-A-3-237307 but to also consider so-called dynamic wheel alignment during the travel of the vehicle is assumed as in JP-A-6-331505.

During the travel of the vehicle, a height position of the wheel assembly relative to a vehicle body is changed by actuation of a suspension device. The wheel alignment is also changed according to this change in the height position of the wheel assembly. A change characteristic of the wheel alignment with respect to this change in the height position of the wheel assembly possibly differs from a targeted design characteristic due to individual variability and assembly variability of the suspension device.

Accordingly, it is necessary to check whether the change characteristic of the wheel alignment with respect to the change in the height position of the wheel assembly mismatches the targeted design characteristic. Then, in the case where such a change characteristic mismatches the targeted design characteristic, the damper characteristic and the bush characteristic are adjusted to make the wheel alignment characteristic match the design characteristic.

In addition to the wheel alignment, the height position of the wheel assembly relative to the vehicle body has to be measured. For this reason, it is preferred that the height position of the wheel assembly relative to the vehicle body can easily and accurately be measured.

The present disclosure has been made in view of such a point and therefore has a purpose of providing a vehicle wheel assembly position measurement method and a vehicle wheel assembly position measurement apparatus capable of easily and accurately measuring a height position of a wheel assembly relative to a vehicle body.

In order to achieve the above purpose, the present disclosure provides a vehicle wheel assembly position measurement method for measuring a height position of a wheel assembly relative to a vehicle body that includes: a distance measurement step of measuring a distance in a vehicle width direction between each of plural measurement points and a distance measuring instrument at at least three measurement positions in a circumferential direction on a lateral surface of a tire section of the wheel assembly, the distance measuring instrument being arranged on a lateral side of each of the measurement positions, and each of the plural measurement points being located on a specified line that crosses the lateral surface of the tire section from an inner circumferential end to an outer circumferential end; a vehicle body position measurement step of measuring a height position of a specified portion of the vehicle body by a vehicle body position measuring instrument; an approximate curve calculation step of calculating, at each of the measurement positions, an approximate curve in a graph on the basis of measurement data of each of the measurement points, at which the distance on the specified line is measured, a relationship between a position in an extending direction of the specified line and the distance of the respective measurement point being plotted in the graph; a rotation center position calculation step of calculating a rotation center position of the wheel assembly from a specific position on the approximate curve at each of the at least three measurement positions; and a wheel assembly height position calculation step of calculating the height position of the wheel assembly relative to the vehicle body from the rotation center position calculated in the rotation center position calculation step and the height position of the specified portion of the vehicle body measured in the vehicle body position measurement step.

With the above configuration, when the distance measuring instrument capable of measuring wheel alignment (a toe angle and a camber angle), for example, measures the distance between each of the plural measurement points located on the specified line on the lateral surface of the tire section and the distance measuring instrument, it is possible to comprehend the position of the measurement point, at which the distance is the shortest, on the specified line, for example. The position of the measurement point with the shortest distance is a position where the tire section bulges most outward in the vehicle width direction by an internal air pressure. It is considered that, when seen in the vehicle width direction, the position of the measurement point with the shortest distance at each of the at least three measurement positions is located on a concentric circle with the rotation center position of the wheel assembly being a center. Thus, it is possible to calculate the rotation center position of the wheel assembly from the positions of the measurement points with the shortest distance at the at least three measurement positions.

However, the lateral surface of the tire section is usually provided with protrusions such as characters indicating tire specifications and a logo. In the case where such a protrusion is located on the specified line, the position of the measurement point with the shortest distance differs from the position where the tire section bulges most outward in the vehicle width direction. As a result, it becomes impossible to accurately calculate the rotation center position of the wheel assembly from the position of such a measurement point.

To handle such a problem, the approximate curve in the graph, in which the relationship between the position in the extending direction of the specified line and the distance of each of the measurement points is plotted, is calculated on the basis of the measurement data of the respective measurement point, at which the distance on the specified line is measured. Even with the protrusion as described above, this approximate curve is similar to a curve without the protrusion. Accordingly, when the rotation center position of the wheel assembly is calculated from the specific position on the approximate curve (for example, the position where the distance is the shortest) at each of the at least three measurement positions, the rotation center position can accurately be calculated.

It is possible to calculate the height position of the wheel assembly relative to the vehicle body from the rotation center position, which is calculated just as described, and the height position of the specified portion of the vehicle body measured by the vehicle body position measuring instrument.

Accordingly, as a hardware configuration, the vehicle body position measuring instrument is added to a wheel alignment measurement apparatus that has conventionally been used, and thus the approximate curve calculation step, the rotation center position calculation step, and the wheel assembly height position calculation step can easily be executed by computer software. Therefore, it is possible to easily and accurately measure the height position of the wheel assembly relative to the vehicle body.

In the vehicle wheel assembly position measurement method, the specific position is preferably a position where the distance is the shortest on the approximate curve.

In this way, it is possible to further easily and accurately calculate the rotation center position of the wheel assembly.

In an embodiment of the vehicle wheel assembly position measurement method, the distance measurement step is a step of irradiating the lateral surface of the tire section with light in a line shape along the specified line by using the distance measuring instrument and measuring a distance in the vehicle width direction between each of the measurement points located in the light irradiated portion of the lateral surface of the tire section and the distance measuring instrument.

In this way, it is possible to facilitate measurement of the distance in the vehicle width direction between each of the plural measurement points located on the specified line on the lateral surface of the tire section and the distance measuring instrument.

In another embodiment of the vehicle wheel assembly position measurement method, the distance measuring instrument can measure wheel alignment of the vehicle.

In this way, it is possible to easily and accurately measure the height position of the wheel assembly relative to the vehicle body by making the brief change to the wheel alignment measurement apparatus.

Another aspect of the present disclosure provides a vehicle wheel assembly position measurement apparatus for measuring a height position of a wheel assembly relative to a vehicle body. This vehicle wheel assembly position measurement apparatus includes: a distance measuring instrument that is arranged on a lateral side of each of at least three measurement positions in a circumferential direction on a lateral surface of a tire section in the wheel assembly and measures a distance in a vehicle width direction to each of plural measurement points at the respective measurement position, each of the plural measurement points being located on a specified line that crosses the lateral surface of the tire section from an inner circumferential end to an outer circumferential end; a vehicle body position measuring instrument that measures a height position of a specified portion of the vehicle body; an approximate curve calculation section that calculates, at each of the measurement positions, an approximate curve in a graph on the basis of measurement data of each of the measurement points, at which the distance on the specified line is measured, a relationship between a position in an extending direction of the specified line and the distance of the respective measurement point being plotted in the graph; a rotation center position calculation section that calculates a rotation center position of the wheel assembly from a specific position on the approximate curve at each of the at least three measurement positions; and a wheel assembly height position calculation section that calculates the height position of the wheel assembly relative to the vehicle body from the rotation center position calculated by the rotation center position calculation section and the height position of the specified portion of the vehicle body measured by the vehicle body position measuring instrument.

With this configuration, similar to the vehicle wheel assembly position measurement method, it is possible to easily and accurately measure the height position of the wheel assembly relative to the vehicle body.

In the vehicle wheel assembly position measurement apparatus, the specific position is preferably a position where the distance is the shortest on the approximate curve.

In this way, it is possible to further easily and accurately calculate the rotation center position of the wheel assembly.

In an embodiment of the vehicle wheel assembly position measurement apparatus, the distance measuring instrument has: an irradiation section that irradiates the lateral surface of the tire section with light in a line shape along the specified line; and a measurement section that measures a distance in the vehicle width direction between each of the measurement points located in the light irradiated portion of the lateral surface of the tire section and the distance measuring instrument.

In this way, it is possible to facilitate measurement of the distance in the vehicle width direction between each of the plural measurement points located on the specified line on the lateral surface of the tire section and the distance measuring instrument.

In yet another embodiment of the vehicle wheel assembly position measurement apparatus, the distance measuring instrument can measure wheel alignment of the vehicle.

In this way, it is possible to easily and accurately measure the height position of the wheel assembly relative to the vehicle body by making the brief change to the wheel alignment measurement apparatus.

As it has been described so far, at each of the measurement positions in the circumferential direction on the lateral surface of the tire section in the wheel assembly, on the basis of the measurement data of each of the measurement points on the specified line, the vehicle wheel assembly position measurement method and the wheel assembly position measurement apparatus according to the present disclosure each calculate the approximate curve in the graph, in which the relationship between the position in the extending direction of the specified line and the distance of each of the measurement points is plotted, calculate the rotation center position of the wheel assembly from the specific position on the approximate curve of each of the at least three measurement positions, and calculate the height position of the wheel assembly relative to the vehicle body from the calculated rotation center position of the wheel assembly and the height position of the specified portion of the vehicle body measured by the vehicle body position measuring instrument. In this way, it is possible to easily and accurately measure the height position of the wheel assembly relative to the vehicle body.

BRIEF DESCRIPTION OF THE DRAWINGS

FIG. 6 is a flowchart illustrating wheel assembly position measurement processing operation by a controller.

DETAILED DESCRIPTION

A detailed description will hereinafter be made of an embodiment of the present disclosure with reference to the drawings.

Figure 1:
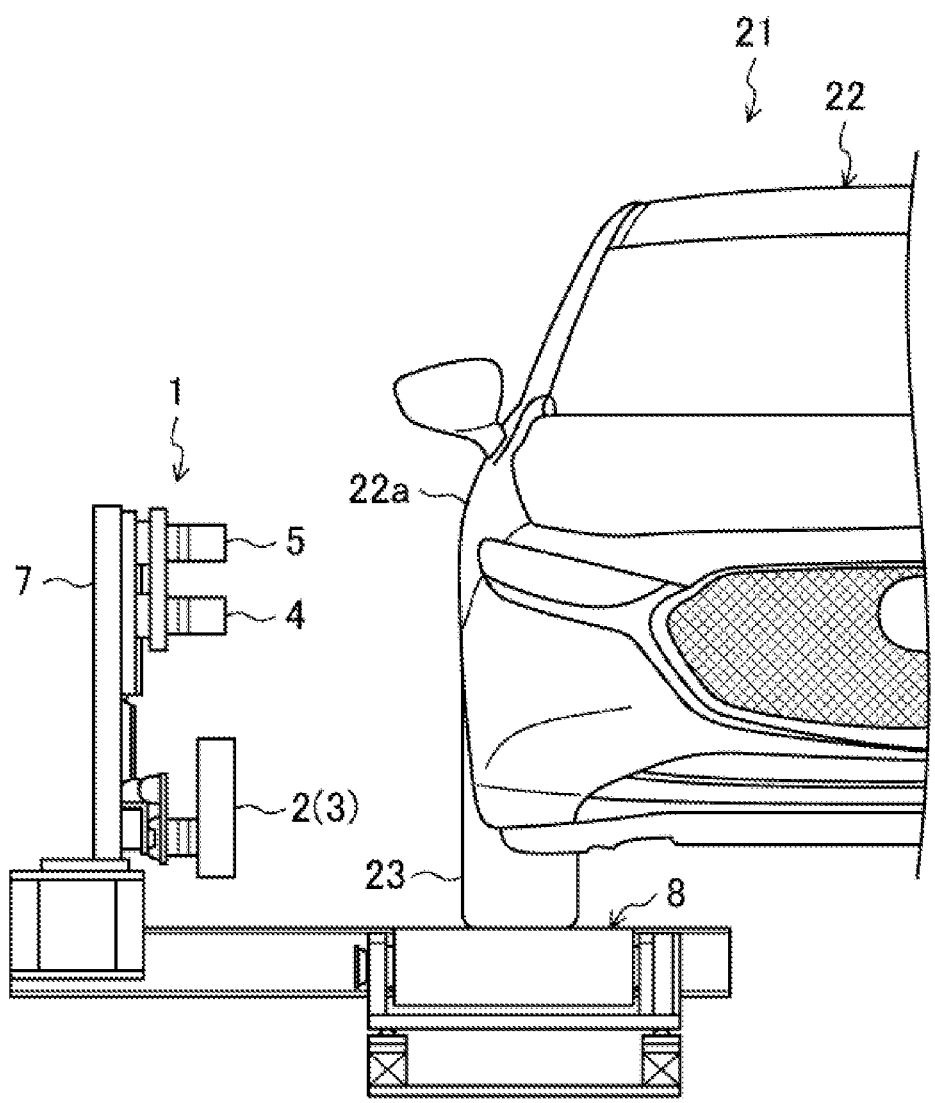
FIG. 1 is a view illustrating a vehicle wheel assembly position measurement apparatus according to an embodiment of the present disclosure that is seen from a vehicle front side.

FIG. 1 illustrates a vehicle wheel assembly position measurement apparatus 1 according to an embodiment of the present disclosure. This wheel assembly position measurement apparatus 1 measures a height position of a wheel assembly 23 relative to a vehicle body 22 in a vehicle 21, and is arranged on a lateral side of each of the wheel assemblies 23 of the vehicle 21 that is arranged at a specified position. Each of the wheel assemblies 23 is supported by the vehicle body 22 via a suspension device, which is not illustrated. When the vehicle 21 is arranged at the specified position, each of the wheel assemblies 23 is located on a wheel assembly drive unit 8 and can be rotated by this wheel assembly drive unit 8. The wheel assembly position measurement apparatuses 1, each of which corresponds to the respective wheel assembly 23, have the same configuration. Thus, a description will hereinafter be made on the wheel assembly position measurement apparatus 1 that corresponds to one of the wheel assemblies 23 (here, a front right wheel assembly). In the following description, front, rear, left, right, upper, and lower sides of the vehicle 21 (the vehicle body 22) will simply be referred to as front, rear, left, right, upper, and lower sides, respectively.

Figure 2:
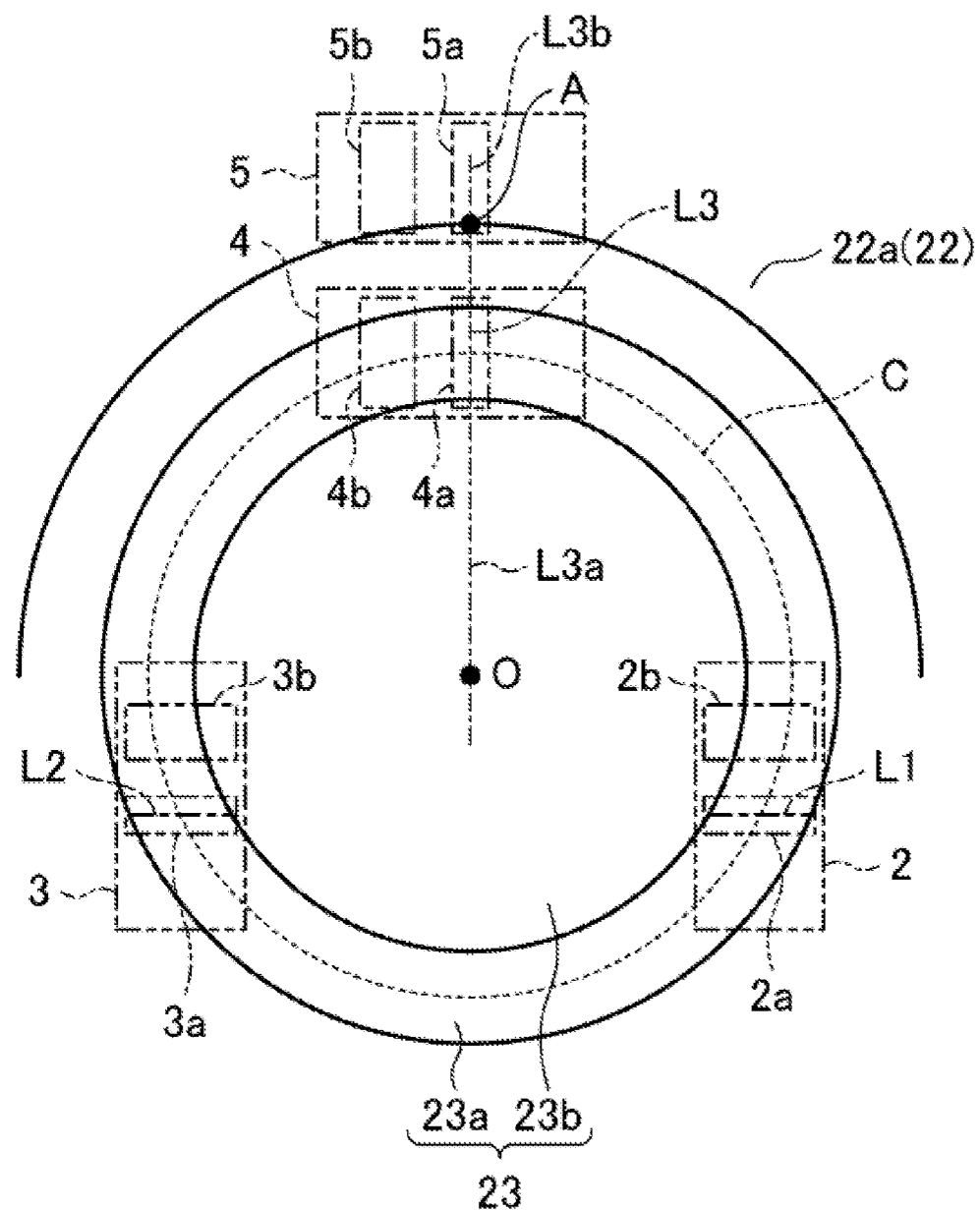
FIG. 2 is a view illustrating positional relationships between a tire section of a wheel assembly and first to third distance measuring instruments and a positional relationship between a fender section of a vehicle body and a vehicle body position measuring instrument, the positional relationships being seen in a vehicle width direction.

As illustrated in FIG. 2, the wheel assembly position measurement apparatus 1 includes first to third distance measuring instruments 2 to 4. The first to third distance measuring instruments 2 to 4 are arranged on lateral sides (here, right sides) of three measurement positions in a circumferential direction on a lateral surface (a lateral surface on an outer side in a vehicle width direction) of a tire section 23a of the wheel assembly 23. The first to third distance measuring instruments 2 to 4 each measure a distance in the vehicle width direction (a right-left direction) to each of plural measurement points located on respective one of specified lines L1, L2, L3, each of which crosses the lateral surface of the tire section 23a from an inner circumferential end to an outer circumferential end, at the respective measurement position. The first to third distance measuring instruments 2 to 4 are supported by a support member 7. However, the four or more measurement positions may be set on the lateral surface of the tire section 23a, and the distance measuring instruments, the number of which corresponds to the number of the measurement positions, may be provided.

In this embodiment, the three measurement positions are a first measurement position that is a lower and front portion in the lateral surface of the tire section 23a, a second measurement position that is a lower and rear portion in the lateral surface of the tire section 23a, and a third measurement position that is the uppermost portion in the lateral surface of the tire section 23a. The first to third measurement positions are positions that are spaced at substantially equal intervals in the circumferential direction. In this embodiment, the specified lines L1, L2 at the first and second measurement positions extend horizontally at the substantially same height positions, and the specified line L3 at the third measurement position extends vertically. When seen in the vehicle width direction, a rotation center position O of the wheel assembly 23 (a rotation center position of a wheel section 23b) is located on a downward extension line L3a of the specified line L3.

The first distance measuring instrument 2 is arranged on a lateral side of the first measurement position, the second distance measuring instrument 3 is arranged on a lateral side of the second measurement position, and the third distance measuring instrument 4 is arranged on a lateral side of the third measurement position.

The first distance measuring instrument 2 has an irradiation section 2a and a measurement section 2b. The irradiation section 2a irradiates the lateral surface of the tire section 23a with light (here, a laser beam) in a line shape along the specified line L1. The measurement section 2b that measures a distance in the vehicle width direction between the first distance measuring instrument 2 and each of the measurement points located in a light irradiated portion in the lateral surface of the tire section 23a. The measurement section 2b has an imaging camera that is located on an upper side of the irradiation section 2a. By using this imaging camera to capture an image of the light irradiated portion in the lateral surface of the tire section 23a obliquely downward, the measurement section 2b can measure the above distance to a portion (that is, a measurement section) that is acquired by equally dividing the light irradiated portion into plural portions in an extending direction of the specified line L1.

The second distance measuring instrument 3 has an irradiation section 3a and a measurement section 3b (an imaging camera). The irradiation section 3a irradiates the lateral surface of the tire section 23a with the light in the line shape along the specified line L2. The measurement section 3b measures a distance in the vehicle width direction between the second distance measuring instrument 3 and each of the measurement points located in the light irradiated portion in the lateral surface of the tire section 23a. The third distance measuring instrument 4 has an irradiation section 4a and a measurement section 4b (an imaging camera). The irradiation section 4a irradiates the lateral surface of the tire section 23a with the light in the line shape along the specified line L3. The measurement section 4b measures a distance in the vehicle width direction between the third distance measuring instrument 43 and each of the measurement points located in the light irradiated portion in the lateral surface of the tire section 23a. Each of the second and third distance measuring instruments 3, 4 has the same configuration as the first distance measuring instrument 2. The imaging camera in the measurement section 4b of the third distance measuring instrument 4 is located on a rear side of the irradiation section 4a, and captures an image of the light irradiated portion, which is irradiated by the irradiation section 4a, in the lateral surface of the tire section 23a obliquely backward.

The wheel assembly position measurement apparatus 1 further includes a vehicle body position measuring instrument 5 that measures a height position of a specified portion in the vehicle body 22. In this embodiment, when seen in the vehicle width direction, the specified portion is the lowest point A (see FIG. 2 and FIG. 3) of a fender section 22a on an upward extension line L3b of the specified line L3. The vehicle body position measuring instrument 5 is supported by the support member 7 in a manner to be located on a lateral side of a portion including the lowest point A of the fender section 22a and on an upper side of the third distance measuring instrument 4.

Here, when seen in the vehicle width direction, the specified portion may be an outermost portion (a point B in FIG. 3) in the vehicle width direction of the fender section 22a on the extension line L3b of the specified line L3. Further alternatively, the specified portion may be any portion of the fender section 22a as long as the height position thereof can be measured.

The vehicle body position measuring instrument 5 has the same configuration as the first to third distance measuring instruments 2 to 4, and has an irradiation section 5a and a measurement section 5b (an imaging camera). The irradiation section 5a irradiates the fender section 22a with the light in the line shape along the extension line L3b of the specified line L3. The measurement section 5b is located on a rear side of the irradiation section 5a, and measures a distance in the vehicle width direction between the vehicle body position measuring instrument 5 and each measurement point located in the light irradiated portion of the fender section 22a.

A controller 11 (see FIG. 4) receives measurement data of each of the measurement points, at which the distance on respective one of the specified lines L1, L2, L3 is measured by respective one of the first to third distance measuring instruments 2 to 4, at the measurement positions. The controller 11 also receives measurement data at each of the measurement points measured by the vehicle body position measuring instrument 5.

The controller 11 is a controller (a processor) that has a well-known microcomputer as a base component, and includes a CPU, memory, an input/output bus, and the like. The CPU is a central processing unit that executes computer programs (including a basic control program such as an OS and an application program that is run on the OS to implement a particular function). The memory is configured to include RAM and ROM. The ROM stores the various computer programs, data, and the like. The RAM is memory provided with a processing area that is used when the CPU executes a series of processing. The input/output bus inputs/outputs an electric signal from/to the controller 11.

Figure 4:
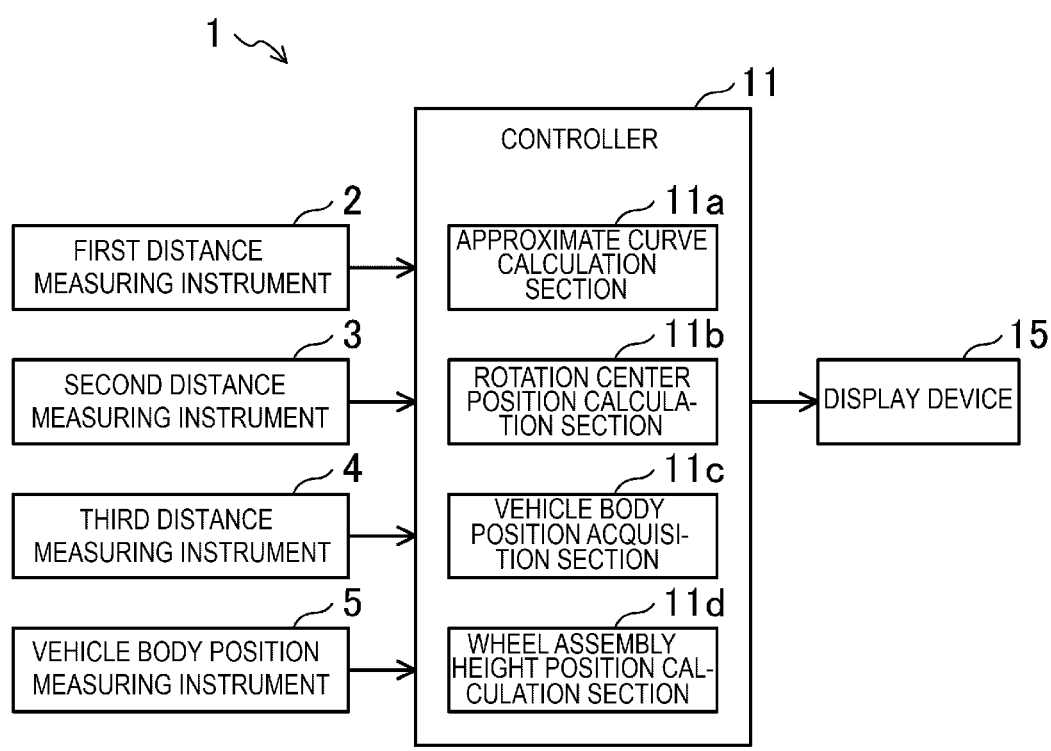
FIG. 4 is a block diagram illustrating a configuration of a control system in the vehicle wheel assembly position measurement apparatus.

As illustrated in FIG. 4, the controller 11 is provided with an approximate curve calculation section 11a, a rotation center position calculation section 11b, a vehicle body position acquisition section 11c, and a wheel assembly height position calculation section 11d therein. The approximate curve calculation section 11a, the rotation center position calculation section 11b, the vehicle body position acquisition section 11c, and the wheel assembly height position calculation section 11d are operated as will be described below according to the computer program stored in the ROM.

The approximate curve calculation section 11a calculates, at each of the measurement positions, an approximate curve (here, a quadratic approximate curve) in a graph, in which a relationship between a position of each of the measurement points in the extending direction of respective one of the specified lines L1, L2, L3 and the distance is plotted, on the basis of the measurement data of the respective measurement point, at which the distance on respective one of the specified lines L1, L2, L3 is measured.

Figure 3:
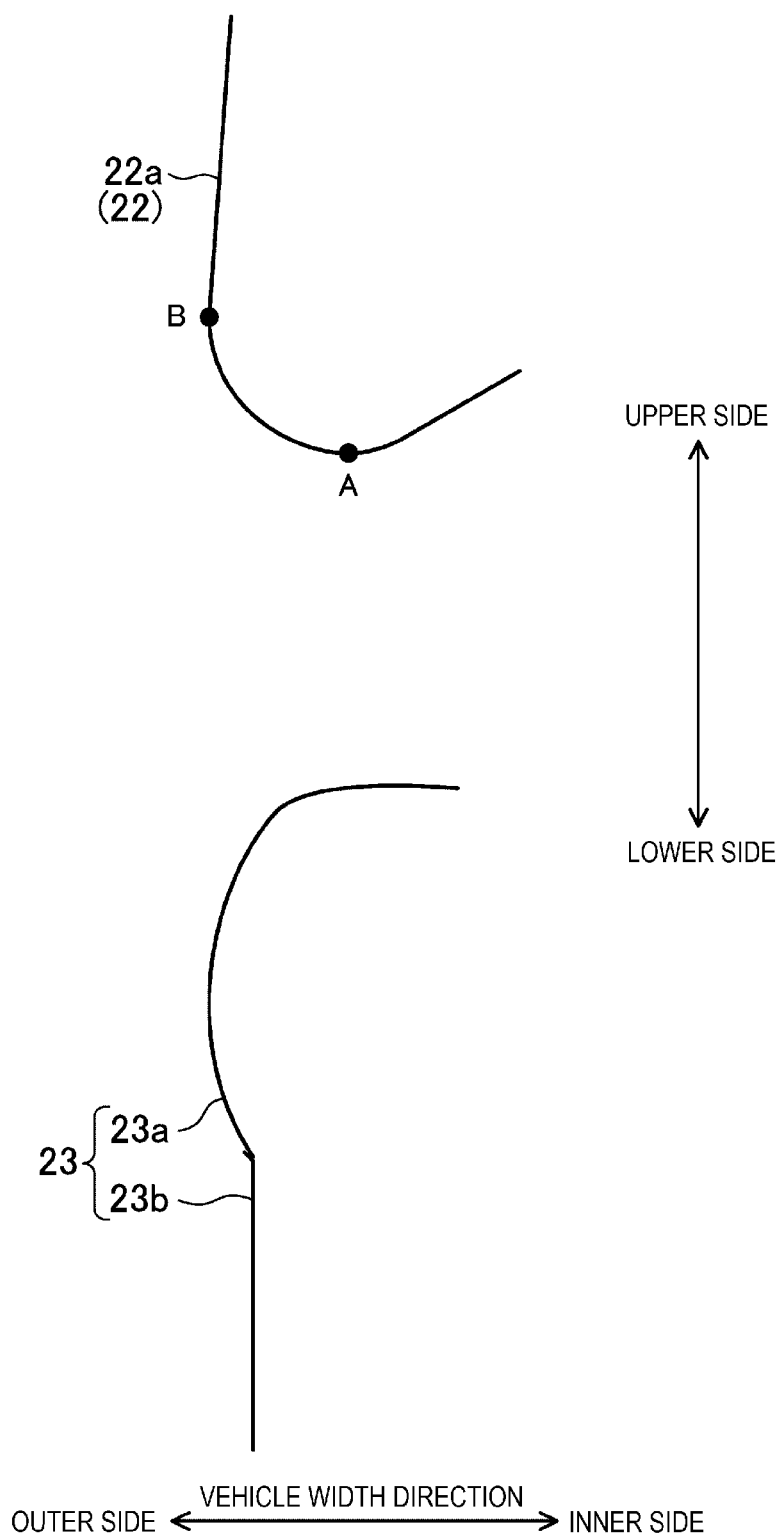
FIG. 3 is a view illustrating contour shapes of the tire section and the fender section on an outer side in the vehicle width direction at the time when a third measurement position in the tire section of the wheel assembly and the fender section of the vehicle body are cut along a specified line and an upward extension line thereof and seen from the vehicle front side.

Here, in the lateral surface of the tire section 23a, a substantially central portion between an inner circumferential end and an outer circumferential end bulges most outward in the vehicle width direction by an internal air pressure (see FIG. 3). That is, the substantially central portion on the specified lines L1, L2, L3 bulges most outward in the vehicle width direction. For this reason, the position of the measurement point with the shortest distance on each of the specified lines L1, L2, L3 is a position that bulges most outward in the vehicle width direction. It is considered that, when seen in the vehicle width direction, the position of the measurement point with the shortest distance at each of the first to third measurement positions is located on a circle C (indicated by a broken line in FIG. 2) with the rotation center position O of the wheel assembly 23 being a center. That is, when seen in the vehicle width direction, a position that is located at the same distance (a radius of the circle C) from the measurement points with the shortest distance at the first to third measurement positions (points, at each of which one of the specified lines L1, L2, L3 intersects the circle C when seen in the vehicle width direction) is the rotation center position O of the wheel assembly 23. Thus, it is possible to calculate the rotation center position O of the wheel assembly 23 from the positions of the measurement points with the shortest distance at the first to third measurement positions.

However, the lateral surface of the tire section 23a is usually provided with protrusions such as characters indicating tire specifications and a logo. In the case where such a protrusion is located on any of the specified lines L1, L2, L3, the position of the measurement point with the shortest distance differs from the position where the tire section 23a bulges most outward in the vehicle width direction. As a result, it becomes impossible to accurately calculate the rotation center position O of the wheel assembly 23 from the position of the measurement point on such a protrusion.

To handle such a problem, in this embodiment, as described above, the approximate curve calculation section 11a calculates, at each of the measurement positions, the approximate curve (the quadratic approximate curve) as described above on the basis of the measurement data of each of the measurement points, at which the distance on respective one of the specified lines L1, L2, L3 is measured.

Figure 5:
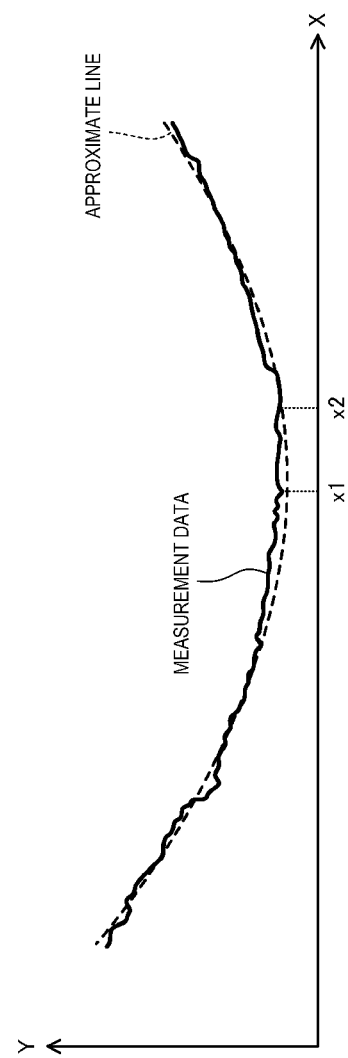
FIG. 5 is a view of an approximate curve (a quadratic approximate curve) drawn in a graph in which, at a first measurement position, a relationship between a position X in an extending direction of the specified line and a distance Y of each measurement point is plotted.

FIG. 5 illustrates an example of a graph in which, at the first measurement position, a relationship between a position X in the extending direction of the specified line L1 and a distance Y of each of the measurement points is plotted. As indicated by a solid line in FIG. 5, in the measurement data of each of the measurement points, the position of the measurement point with the shortest distance is x2 due to the protrusion, and is a position that is shifted from a position x1 where the tire section 23a bulges most outward in the vehicle width direction.

Meanwhile, as indicated by a broken line in FIG. 5, similar to a case where no protrusion is present, the approximate curve is a curve that is minimum (the distance becomes the shortest) at x1, and a position where the curve is minimum is the position where the tire section 23a bulges most outward in the vehicle width direction. In FIG. 5, the approximate curve is illustrated in an exaggerated manner to facilitate understanding.

The rotation center position calculation section 1 1b calculates the positions, at each of which the approximate curve is minimum (corresponding to a specific position on the approximate curve), at the first to third measurement positions, and then calculates the rotation center position O of the wheel assembly 23 from these positions, at each of which the approximate curve is minimum. The specific position on the approximate curve is not limited to the position where the approximate curve is minimum. However, from a perspective of further easily and accurately calculating the rotation center position O of the wheel assembly 23, it is preferred to set the position where the approximate curve is minimum as the specific position.

Here, in the case where there are four or more measurement positions, three measurement positions are selected from those, and a provisional rotation center position of wheel assembly 23 is calculated from the positions, at each of which the approximate curve is minimum, at the three measurement positions. In addition, the provisional rotation center position of the wheel assembly 23 is calculated for another combination of the three measurement positions. In this way, the provisional rotation center position of the wheel assembly 23 is calculated for all the combinations. Then, for example, an average position of all the provisional rotation center positions of the wheel assembly 23 is determined as the rotation center position O of the wheel assembly 23.

The vehicle body position acquisition section 11c acquires a height position of the lowest point A of the fender section 22a (a specified portion of the vehicle body 22) on the extension line L3b of the specified line L3 from the measurement data of each of the measurement points by the vehicle body position measuring instrument 5. The fender section 22a is not provided with a protrusion like one in the tire section 23a. Accordingly, the height position of the lowest point A of the fender section 22a can easily be acquired from the measurement data of each of the measurement points measured by the vehicle body position measuring instrument 5 without calculating the approximate curve and the like.

The wheel assembly height position calculation section 11d calculates the height position of the wheel assembly 23 relative to the vehicle body 22 from the rotation center position O of the wheel assembly 23, which is calculated by the rotation center position calculation section 11b, and the height position of the lowest point A of the fender section 22a, which is measured by the vehicle body position measuring instrument 5 (in detail, acquired by the vehicle body position acquisition section 11c).

The controller 11 sends information on the height position of the wheel assembly 23 relative to the vehicle body 22, which is calculated by the wheel assembly height position calculation section 11d, to a display device 15 and causes the display device 15 to show the height position.

FIG. 6 is a flowchart illustrating wheel assembly position measurement processing operation by the controller 11. This flowchart is started by a worker's switch operation, for example. With this switch operation, the distance is measured by each of the first to third distance measuring instruments 2 to 4 and the vehicle body position measuring instrument 5.

In first step S1, the measurement data of each of the measurement points on the specified lines L1, L2, L3 is input from the first to third distance measuring instruments 2 to 4. In next step S2, the measurement data of each of the measurement points on the extension line L3b of the specified line L3 is input from the vehicle body position measuring instrument 5.

In next step S3, the approximate curve calculation section 11a calculates the approximate curve (the quadratic approximate curve) on the basis of the measurement data of each of the measurement points on the specified lines L1, L2, L3.

In next step S4, the rotation center position calculation section 11b calculates the positions, at each of which the approximate curve is minimum, at the first to third measurement positions, and then calculates the rotation center position O of the wheel assembly 23 from these positions, at each of which the approximate curve is minimum.

In next step S5, the vehicle body position acquisition section 11c acquires the height position of the lowest point A of the fender section 22a on the extension line L3b of the specified line L3 from the measurement data of each of the measurement points by the vehicle body position measuring instrument 5. However, the processing operation in step S5 may be executed at any timing as long as being executed after step S2 and before step S6, which will be described below.

In next step S6, the wheel assembly height position calculation section 11d calculates the height position of the wheel assembly 23 relative to the vehicle body 22 from the rotation center position O of the wheel assembly 23, which is calculated by the rotation center position calculation section 11b, and the height position of the lowest point A of the fender section 22a, which is acquired by the vehicle body position acquisition section 11c.

In next step S7, the display device 15 shows the height position of the wheel assembly 23 relative to the vehicle body 22, which is calculated in step S6, and thereafter the wheel assembly position measurement processing operation is terminated.

In this embodiment, the first to third distance measuring instruments 2 to 4 can each measure wheel alignment of the vehicle 21. That is, the first to third distance measuring instruments 2 to 4 are used in a wheel alignment measurement apparatus that has conventionally been used.

The first and second distance measuring instruments 2, 3 can measure a toe angle. More specifically, the toe angle can be measured from a difference between the distances to the measurement points measured by the first and second distance measuring instruments 2, 3 at the positions, at each of which the lateral surface of the tire section 23a bulges most outward in the vehicle width direction, and a distance in a front-rear direction between both of the measurement points.

In addition, the first to third distance measuring instruments 2 to 4 can measure a camber angle. More specifically, the camber angle can be measured from a difference between an average value of the distances to the measurement points, which are measured by the first and second distance measuring instruments 2, 3, at the positions, at each of which the lateral surface of the tire section 23a bulges most outward in the vehicle width direction and the distance to the measurement point, which is measured by the third distance measuring instrument 4, at the position where the lateral surface of the tire section 23a bulges most outward in the vehicle width direction, and from a distance in an up-down direction between the measurement point and any one of both of the measurement points for calculating the average value of the distances.

As described above, the wheel assembly position measurement apparatus 1 in this embodiment is configured by adding the vehicle body position measuring instrument 5 and changing software for the controller 11 in the wheel alignment measurement apparatus that has conventionally been used. In this way, during the travel of the vehicle (when the wheel assembly 23 is rotationally driven by the wheel assembly drive unit 8), the wheel assembly position measurement apparatus 1 can measure the height position of the wheel assembly 23 relative to the vehicle body 22 while measuring the wheel alignment.

Thus, in this embodiment, at each of the measurement positions in the circumferential direction on the lateral surface of the tire section 23a in the wheel assembly 23, on the basis of the measurement data of each of the measurement points on the specified lines L1, L2, L3 by the first to third distance measuring instruments 2 to 4, the approximate curve in the graph, in which the position in the extending direction of respective one of the specified lines L1, L2, L3 and the distance of each of the measurement points is plotted, is calculated, the rotation center position O of the wheel assembly 23 is calculated from the positions, at each of which the approximate curve is minimum, at the first to third measurement positions, and the height position of the wheel assembly 23 relative to the vehicle body 22 is calculated from the calculated rotation center position O of the wheel assembly 23 and the height position of the lowest point A of the fender section 22a on the extension line L3b of the specified line L3, which is measured by the vehicle body position measuring instrument. In this way, it is possible to easily and accurately measure the height position of the wheel assembly 23 relative to the vehicle body 22.

The present disclosure is not limited to the above embodiment and can be substituted within the scope that does not depart from the gist of the claims.

The above-described embodiment is merely illustrative, and thus the scope of the present disclosure should not be interpreted in a restrictive manner. The scope of the present disclosure is defined by the claims, and all modifications and changes falling within equivalents of the claims fall within the scope of the present disclosure.

The present disclosure is useful for the vehicle wheel assembly position measurement method and the vehicle wheel assembly position measurement apparatus for measuring the height position of the wheel assembly relative to the vehicle body.

What is claimed is:

1. A vehicle wheel assembly position measurement method for measuring a height position of a wheel assembly relative to a vehicle body, the vehicle wheel assembly position measurement method comprising:

a distance measurement step of measuring a distance in a vehicle width direction between each of plural measurement points and a distance measuring instrument at at least three measurement positions in a circumferential direction on a lateral surface of a tire section of the wheel assembly, the distance measuring instrument being arranged on a lateral side of each of the measurement positions, and each of the plural measurement points being located on a specified line that crosses the lateral surface of the tire section from an inner circumferential end to an outer circumferential end;

a vehicle body position measurement step of measuring a height position of a specified portion of the vehicle body by a vehicle body position measuring instrument;

an approximate curve calculation step of calculating, at each of the measurement positions, an approximate curve in a graph on the basis of measurement data of each of the measurement points, at which the distance on the specified line is measured, a relationship between a position in an extending direction of the specified line and the distance of the respective measurement point being plotted in the graph;

a rotation center position calculation step of calculating a rotation center position of the wheel assembly from a specific position on the approximate curve at each of the at least three measurement positions; and a wheel assembly height position calculation step of calculating the height position of the wheel assembly relative to the vehicle body from the rotation center position calculated in the rotation center position calculation step and the height position of the specified portion of the vehicle body measured in the vehicle body position measurement step.

2. The vehicle wheel assembly position measurement method according to claim 1,
wherein the distance measuring instrument can measure wheel alignment of the vehicle.

3. The vehicle wheel assembly position measurement method according to claim 1,
wherein the distance measurement step is a step of irradiating the lateral surface of the tire section with light in a line shape along the specified line by using the distance measuring instrument and measuring a distance in the vehicle width direction between each of the measurement points located in the light irradiated portion of the lateral surface of the tire section and the distance measuring instrument.

4. The vehicle wheel assembly position measurement method according to claim 3,
wherein the distance measuring instrument can measure wheel alignment of the vehicle.

5. The vehicle wheel assembly position measurement method according to claim 1,
wherein the specific position is a position where the distance is the shortest on the approximate curve.

6. The vehicle wheel assembly position measurement method according to claim 5,
wherein the distance measuring instrument can measure wheel alignment of the vehicle.

7. The vehicle wheel assembly position measurement method according to claim 5,
wherein the distance measurement step is a step of irradiating the lateral surface of the tire section with light in a line shape along the specified line by using the distance measuring instrument and measuring a distance in the vehicle width direction between each of the measurement points located in the light irradiated portion of the lateral surface of the tire section and the distance measuring instrument.

8. The vehicle wheel assembly position measurement method according to claim 7,
wherein the distance measuring instrument can measure wheel alignment of the vehicle.

9. A vehicle wheel assembly position measurement apparatus for measuring a height position of a wheel assembly relative to a vehicle body, the vehicle wheel assembly position measurement apparatus comprising:
a distance measuring instrument that is arranged on a lateral side of each of at least three measurement positions in a circumferential direction on a lateral surface of a tire section in the wheel assembly and measures a distance in a vehicle width direction to each of plural measurement points at the respective measurement position, each of the plural measurement points being located on a specified line that crosses the lateral surface of the tire section from an inner circumferential end to an outer circumferential end;
a vehicle body position measuring instrument that measures a height position of a specified portion of the vehicle body;
an approximate curve calculation section that calculates, at each of the measurement positions, an approximate curve in a graph on the basis of measurement data of each of the measurement points, at which the distance on the specified line is measured, a relationship between a position in an extending direction of the specified line and the distance of the respective measurement point being plotted in the graph;
a rotation center position calculation section that calculates a rotation center position of the wheel assembly from a specific position on the approximate curve at each of the at least three measurement positions; and
a wheel assembly height position calculation section that calculates the height position of the wheel assembly relative to the vehicle body from the rotation center position calculated by the rotation center position calculation section and the height position of the specified portion of the vehicle body measured by the vehicle body position measuring instrument.

10. The vehicle wheel assembly position measurement apparatus according to claim 9,
wherein the distance measuring instrument can measure wheel alignment of the vehicle.

11. The vehicle wheel assembly position measurement apparatus according to claim 9,
wherein the distance measuring instrument has: an irradiation section that irradiates the lateral surface of the tire section with light in a line shape along the specified line; and a measurement section that measures a distance in the vehicle width direction between each of the measurement points located in the light irradiated portion of the lateral surface of the tire section and the distance measuring instrument.

12. The vehicle wheel assembly position measurement apparatus according to claim 11,
wherein the distance measuring instrument can measure wheel alignment of the vehicle.

13. The vehicle wheel assembly position measurement apparatus according to claim 9,
wherein the specific position is a position where the distance is the shortest on the approximate curve.

14. The vehicle wheel assembly position measurement apparatus according to claim 13,
wherein the distance measuring instrument can measure wheel alignment of the vehicle.

15. The vehicle wheel assembly position measurement apparatus according to claim 13,
wherein the distance measuring instrument has: an irradiation section that irradiates the lateral surface of the tire section with light in a line shape along the specified line; and a measurement section that measures a distance in the vehicle width direction between each of the measurement points located in the light irradiated portion of the lateral surface of the tire section and the distance measuring instrument.

16. The vehicle wheel assembly position measurement apparatus according to claim 15,
wherein the distance measuring instrument can measure wheel alignment of the vehicle.

* * * * *